(12) United States Patent
Jun et al.

(10) Patent No.: US 7,727,577 B2
(45) Date of Patent: Jun. 1, 2010

(54) APPARATUS AND METHOD FOR FABRICATING A LIQUID CRYSTAL DISPLAY PANEL

(75) Inventors: Jae Hong Jun, Seoul (KR); Yong Bum Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 424 days.

(21) Appl. No.: 10/266,817

(22) Filed: Oct. 9, 2002

(65) Prior Publication Data

US 2003/0214541 A1  Nov. 20, 2003

(30) Foreign Application Priority Data

May 16, 2002  (KR) ............. 10-2002-0027181

(51) Int. Cl.
- *B05D 5/12* (2006.01)
- *B05D 1/02* (2006.01)
- *B05D 5/00* (2006.01)

(52) U.S. Cl. ............ 427/58; 427/256; 427/422; 427/559

(58) Field of Classification Search ........ 427/58, 427/256, 422, 559
See application file for complete search history.

(56) References Cited

U.S. PATENT DOCUMENTS

| | | | |
|---|---|---|---|
| 4,653,864 A * | 3/1987 | Baron et al. | 349/156 |
| 5,418,561 A * | 5/1995 | Fujioka | 347/88 |
| 5,712,064 A * | 1/1998 | Miyazaki et al. | 430/7 |
| 5,956,112 A * | 9/1999 | Fujimori et al. | 349/156 |
| 6,245,469 B1 * | 6/2001 | Shiba et al. | 430/7 |
| 6,501,527 B1 * | 12/2002 | Hirose et al. | 349/155 |
| 6,583,549 B2 * | 6/2003 | Takenaka et al. | 313/422 |

FOREIGN PATENT DOCUMENTS

| | | | |
|---|---|---|---|
| JP | 2000/246887 | | 9/2000 |
| WO | WO 01/71760 | * | 9/2001 |

* cited by examiner

*Primary Examiner*—Timothy H Meeks
*Assistant Examiner*—Jimmy Lin
(74) *Attorney, Agent, or Firm*—Morgan Lewis & Bockius LLP

(57) ABSTRACT

An apparatus for fabricating a liquid crystal display panel includes a vessel for containing a spacer material, an ink-jet device for jetting the spacer material across a space onto a substrate; and a heater for heating the ink-jet device. A method for fabricating a liquid crystal display panel includes the steps of aligning an ink-jet device filled with a spacer material relative to a substrate of a liquid crystal display device, jetting the spacer material from the ink-jet device across a space onto the substrate and heating the spacer material before the spacer material is jetted from the ink-jet device.

6 Claims, 6 Drawing Sheets

APPARATUS AND METHOD FOR FABRICATING A LIQUID CRYSTAL DISPLAY PANEL

The present invention claims the benefit of Korean Application No. P2002-27181 filed in the Republic of Korea on May 16, 2002, which is hereby incorporated in its entirety.

BACKGROUND OF THE INVENTION

1. Field of the Invention

This invention relates to a liquid crystal display panel, and more particularly to an apparatus and method for fabricating a liquid crystal display panel.

2. Description of the Related Art

Generally, a liquid crystal display (LCD) controls the light transmittance of each liquid crystal cell in response to a video signal. Accordingly, a picture is displayed corresponding to the video signals on a LCD panel having liquid crystal cells arranged in a matrix. To this end, the LCD panel includes an active area having liquid crystal cells arranged in a matrix and driving circuits for driving the liquid crystal cells in the active area.

Referring to FIG. 1, a conventional LCD includes an upper plate consisting of a black matrix 20, a color filter 16, a common electrode 14 and an upper alignment film 12 that are sequentially provided on the upper substrate 11. The conventional LCD also includes a lower plate consisting of a lower substrate 1 on which a thin film transistor (TFT) 25/6/26/27/28/30, a pixel electrode 22 and a lower alignment film 10 are sequentially provided. In addition, the conventional LCD includes a spacer 24 and a liquid crystal (not shown) provided between the upper plate and the lower plate.

In the lower plate, the TFT includes a gate electrode 25 connected to a gate line (not shown), a source electrode 28 connected to a data line (not shown), and a drain electrode 30 connected, via a contact hole 23, to the pixel electrode 22. Further, the TFT includes a gate insulating film 6 for insulating the gate electrode 25, and an active semiconductor layer 26 on the gate insulating film for creating a conductive channel between the source electrode 28 and the drain electrode 30 when a gate voltage is applied to the gate electrode 25. As shown in FIG. 1, ohmic semiconductor layers 27 are respectively provided between the active layer 26 and the source/drain electrodes 28 and 30 and doped with an impurity for an ohmic contact between the active semiconductor layer 26 to the source electrode 28 and between the active semiconductor layer 26 to the drain electrode 30.

When a gate signal is applied to the gate line of the TFT, a data signal from a data line can be switched through the TFT to the pixel electrode 22. As a result, the liquid crystal is rotated by means of a voltage difference between a data signal applied to the pixel electrode 22 via the TFT and a common voltage Vcom applied to a common electrode 14. Accordingly, light transmission quantity through the liquid crystal is determined by the arrangement of the liquid crystal.

The pixel electrode 22 is positioned at an area adjacent to the intersection of a data line and a gate line, and is made from a transparent conductive material having a high light transmittance. The pixel electrode 22 is provided on a protective film 8 that is on the surface of the lower substrate 1, and is electrically connected, via a contact hole 23 in the protective film 8, to the drain electrode 30. An upper portion of the lower substrate 1, provided with the pixel electrode 22, is coated with an alignment film 10 that is subjected to a rubbing process, which completes the assembly of the lower plate.

The black matrix 20 of the upper plate is formed on the upper substrate 11 in correspondence with the TFT area of the lower plate and an area adjacent to the intersection of a gate line and a data line. The black matrix 20 also defines a liquid crystal cell area in which a color filter 16 will be formed. Further, the black matrix 20 plays a role in preventing light leakage and absorbing an external light such that contrast can be enhanced. The color filter 16 is formed in the cell area as defined by the black matrix 20. The color filter 16 specifically transmits a wavelength of light for a certain color, such as red, green or blue colors. The common electrode 14 is formed on the color filter 16. The alignment film 12 is formed by coating an alignment material, such as polyimide, on the common electrode 14 and then the rubbing process is carried out.

Ball spacers, like ball spacer 24, are sprinkled onto either one of the upper plate or the lower plate of a LCD panel by means of a jet nozzle to define a gap between the upper plate and the lower plate. The ball spacers should be uniformly distributed for the purpose of keeping a uniform cell gap of the LCD panel. However, it is difficult to uniformly distribute ball spacers due to the randomness in any sprinkling system. If the ball spacers are not uniformly distributed in the LCD panel, the cell gap in individual liquid crystal cells may not be uniform such that a stain-like appearance phenomenon is created in one or more areas on the LCD panel. In addition, if a user applies a pressure to the screen at the exterior of the LCD panel when ball spacers are used, a ripple phenomenon can occur in which the picture on the LCD panel has darkened areas shaped like waves. The darkened wave-shaped areas occur because the ball spacers have been shifted around between the upper plate and the lower plate.

Recently, there has been a study to provide a spacer that is fixed and patterned at a specific location to overcome the disadvantages of the ball spacer 24 and its sprinkling system. Hereinafter, a manufacturing method of the pattern spacer will be described with reference to FIG. 2A to FIG. 2C and FIG. 3. More particularly, FIG. 2A to FIG. 2C are cross-sectional views showing a process of manufacturing a conventional pattern spacer, which will be described in conjunction with FIG. 3, which is a flow chart.

A spacer material 42a, as shown in FIG. 2A is coated onto a substrate 40, as referred to in step S31 of FIG. 3. The substrate 40 can be either one of the upper plate provided with the upper plate or the lower plate provided with the TFT. The spacer material 42a is a material that is mixed with a solvent, a binder, a monomer and a photo-initiator. As referred to in step S32 of FIG. 3, the spacer material 42a is subject to a pre-baking to eliminate a solvent within the spacer material 42a, thereby making the spacer material 42a into a paste-like state.

Subsequently, as shown in FIG. 2B, a photo mask 44 having a transmission part 44a and a shielding part 44b is aligned on the spacer material 42a. As referred to in step S33 of FIG. 3, when an ultraviolet (UV) ray is irradiated onto the spacer material 42a through the photo mask 44, the spacer material corresponding to the transmission part 44a is exposed to the ultraviolet ray.

As shown in FIG. 2C and referred to in step S34 of FIG. 3, the spacer material 42a is patterned. When the spacer material 42a is developed using a negative process, the spacer material 42a that is not exposed to the ultraviolet ray is removed while the spacer material that is exposed to the ultraviolet ray is left. When the spacer material 42a is developed using a positive process, the spacer material 42a that is exposed to the ultraviolet ray is removed while the spacer material that is not exposed to the ultraviolet ray is left. As referred to in step S35 of FIG. 3, the spacer material 42a patterned in this manner is cured to form a spacer 42 having a desired height.

The spacer 42 for keeping a cell gap in the LCD panel can occupy about 20% of the entire area in a liquid crystal cell. If the spacer 42 is formed by the above-mentioned photolithography technique using a spin-coating technique, then more than 95% of the spacer material 42a is spun off when applying the photolithographic spacer material. Thus, the conventional photolithography wastes a lot of material in forming the spacer 42 and is inconvenient in that it requires a complex five-step process.

To reduce the waste of material and the number of process step, there has been a spacer formation method suggested using an ink-jet device as shown in FIG. 4A to FIG. 4C. As shown in FIG. 4A, an ink-jet device 50 corresponding to a formation position of the spacer 58 is aligned. In this alignment state, ink from the inkjet device 50 is jetted to the substrate 40. The substrate 40 corresponds to at least one of the upper and lower plates of a LCD panel. The ink-jet device 50 jets ink using a thermal system or a piezoelectric system. Typically, the latter system is used. The ink-jet device 50 using the piezoelectric system consists of a vessel 52 for containing a material to be jetted, and an ink-jet head 54 for jetting a material from the vessel 52.

The vessel 52 is filled with the spacer material 58, and the ink-jet head 54 is provided with a piezoelectric device and a nozzle 56 for jetting the spacer 58 material from the vessel 52. When a voltage is applied to the piezoelectric device, a physical pressure is generated to cause a capillary phenomenon in which a flow path between the vessel 52 and the nozzle 56 repeatedly contracts and relaxes. Due to this capillary phenomenon, the spacer material 58 jets out of the nozzle 56 onto the substrate 40, as shown in FIG. 4B. Then, a curing process is used that exposes the spacer material 58 on the substrate 40 to an ultraviolet ray from a light source 60, as shown in FIG. 4C. Thus, the spacer material can be hardened into a spacer 59 with a width W and a height H, as shown in FIG. 4C.

However, the spacer 58 material is affected by gravity while falling onto the substrate 40, as well as, by being jetted from the ink-jet device 50. Thus, the spacer material has a wide spread on the substrate 40 when forming a spacer of at least a minimum height for keeping the cell gaps between the upper plate and the lower plate of the LCD panel. Accordingly, it is only possible to obtain a spacer of a certain height corresponding to the maximum width of the spacer on the substrate. If the height of the spacer for keeping a minimum cell gap is not obtained, then brightness and contrast are reduced causing a deterioration of picture quality. If the width of the spacer is too wide for a black matrix area of the upper plate or a TFT area of the lower plate, then aperture area of the LCD panel is reduced.

The viscosity of the spacer material 58 jetted from the ink-jet device 50 is about 5 to 13 cp. A spacer material 58 having such a viscosity has a very low solid content ratio of below 30%. Since the solid content of the spacer material 58 is low, the bulk shape of the spacer 59 is different after curing than before curing. For example, as shown in FIG. 5, the bulk A' of the spacer 59 after curing is about three to four times less than a bulk A of the spacer material 58 before curing. Thus, to obtain a desired height of the spacer 58, a contact angle θ of the spacer material 58, measured within the spacer material 58 between the surface of the substrate 40 and a surface of the spacer material 58 where the spacer material meets the substrate 40, must have a value greater than 90° before curing. However, a spacer material 58 having a contact angle greater than 90° is extremely rare. Furthermore, if the contact angle has a value of more than 90°, the adhesion between the spacer 58 material and the substrate is reduced.

SUMMARY OF THE INVENTION

Accordingly, the present invention is directed to an apparatus and method for fabricating a liquid crystal display that substantially obviates on or more of the problems due to limitations and disadvantages of the related art. An object of the present invention is to provide an apparatus and method for fabricating a liquid crystal display wherein a spacer is positioned for the purpose of keeping a cell gap.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages, and in accordance with the purpose of the present invention, as embodied and broadly described, an embodiment of the invention is an apparatus for fabricating a liquid crystal display panel including a vessel for containing a spacer material, an ink-jet device for jetting the spacer material across a space onto a substrate and a heater for heating the ink-jet device.

In another embodiment of the invention, a method for fabricating a liquid crystal display panel includes the steps of aligning an ink-jet device filled with a spacer material relative to a substrate of a liquid crystal display device, jetting the spacer material from the ink-jet device across a space onto the substrate and heating the spacer material before the spacer material is jetted from the ink-jet device.

BRIEF DESCRIPTION OF THE DRAWINGS

The accompanying drawings, which are included to provide further understanding of the invention and are incorporated in and constitute a part of the specification, illustrate embodiments of the invention and together with the description serve to explain the principles of the invention. These and other objects of the invention will be apparent from the following detailed description of the embodiments of the present invention with reference to the following drawings.

DETAILED DESCRIPTION OF THE PREFERRED EMBODIMENT

Figure 1:
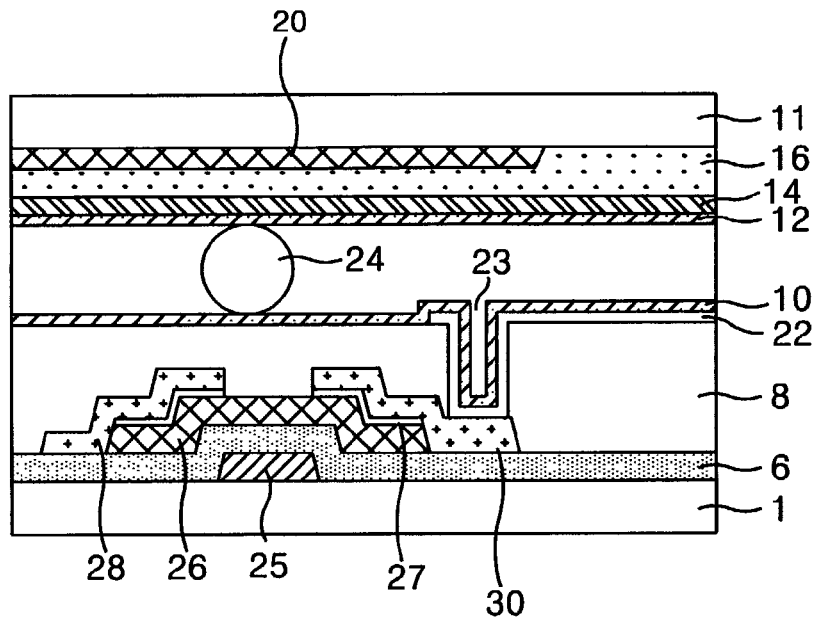
FIG. 1 is a cross-sectional view showing a structure of a conventional liquid crystal display.
Figure 2A:
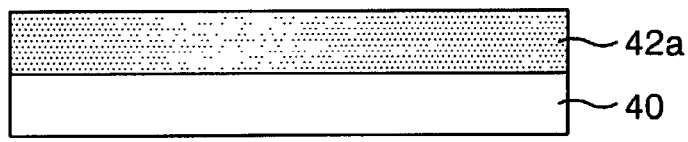
FIG. 2A to FIG. 2C are section views representing a process of manufacturing a conventional spacer.
Figure 2B:
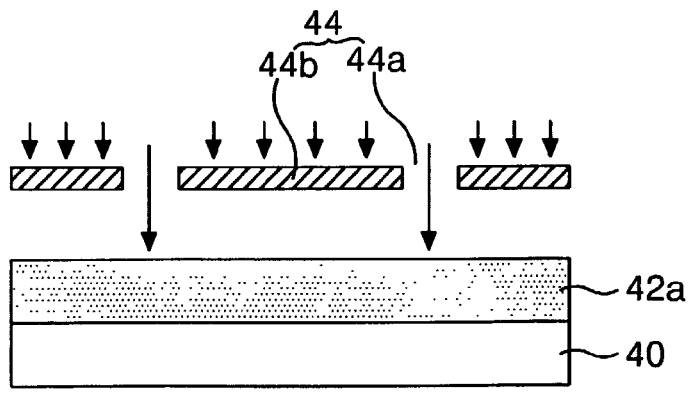
Figure 2C:
Figure 3:
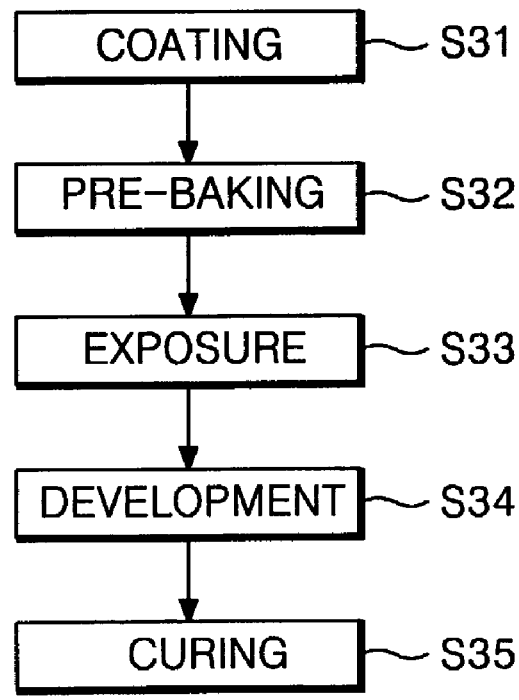
FIG. 3 is a flow chart representing the spacer manufacturing method shown in FIG. 2.
Figure 4A:
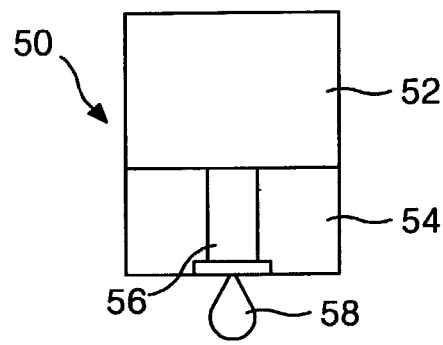
FIGS. 4A to 4C depict the conventional spacer manufacturing method employing and ink-jet system.
Figure 4A:
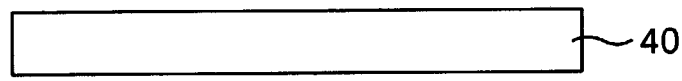
Figure 4B:
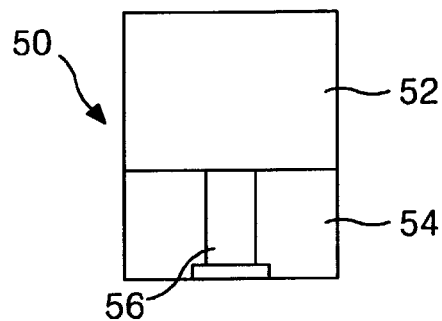
Figure 4B:
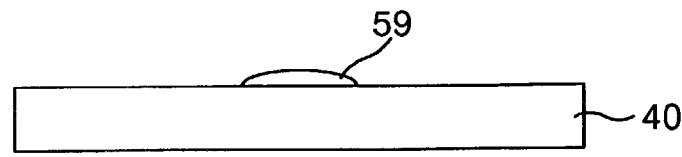
Figure 4C:
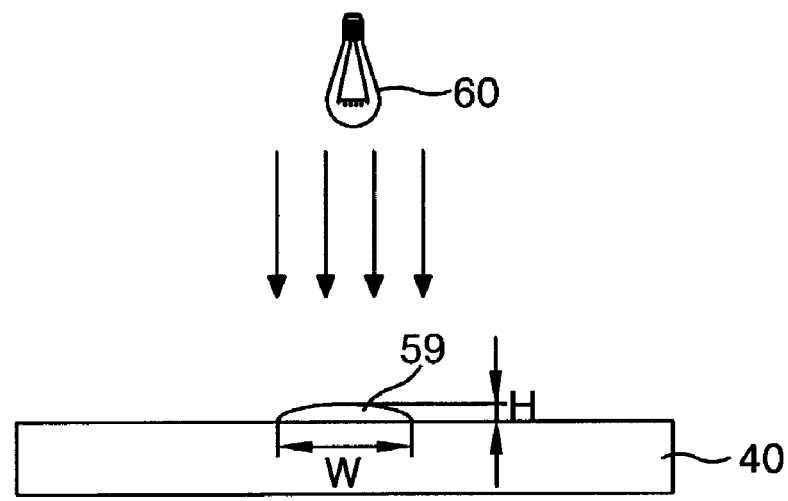
Figure 5:
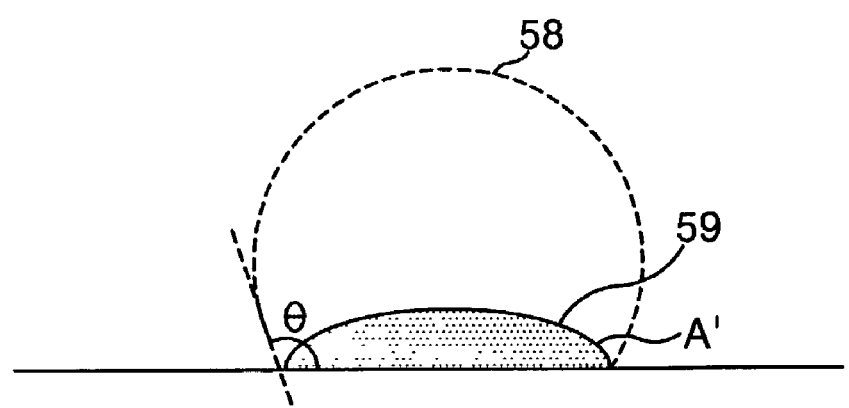
FIG. 5 depicts the shapes of a spacer material before curing and a spacer after curing of the spacer material shown in FIG. 4C.
Figure 6:
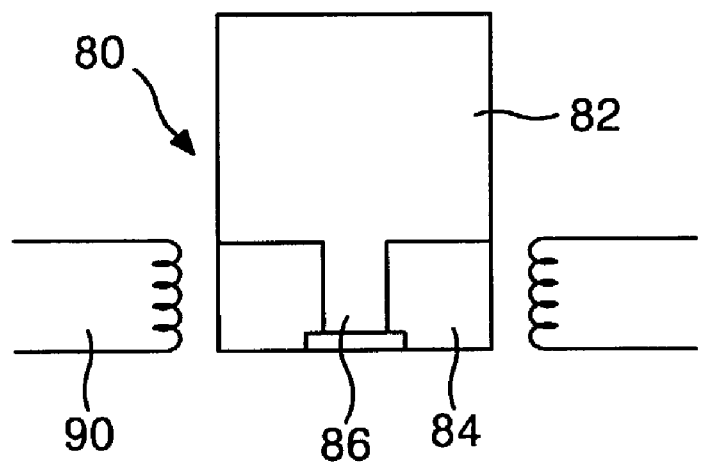
FIG. 6 shows a liquid crystal display device employing an ink-jet system according to an embodiment of the present invention.

Referring to FIG. 6, an apparatus for fabricating a liquid crystal display device according to an embodiment of the present invention includes heater 90 positioned around a head 84 of an ink-jet device 80. The ink-jet device 80 includes a vessel 82 for containing spacer material having a viscosity of greater than 15 cp, and an inkjet head 84 for jetting the spacer material from the vessel 82. The ink-jet head 84 is provided with a piezoelectric device and a nozzle 86 for jetting the material contained in the vessel 82 out of the ink-jet device 80.

Each side of the ink-jet head 84 is provided with a heater 90 for applying heat, for example, the nozzles of heat guns. In the alternative, heat can be applied with a resistance heater positioned around the nozzle 86. In another alternative, infrared heating elements are positioned around the nozzle. The heater 90 applies heat to the nozzle as the spacer material is jetted from the nozzle 86 of the ink-jet device 80 to reduce the viscosity of the spacer material prior to the spacer material impacting the substrate.

The viscosity of the spacer material decreases as the spacer material jets from the nozzle to the substrate due to the increased temperature imparted on the spacer material by the heater 90 through the nozzle 86 of the ink-jet device 80. The viscosity of the spacer material is increased prior to impacting upon the substrate due to cooling by the air in the space between the substrate and the nozzle. Thus, the spacer material does not spread out as much or have a wide width relative to the height as in the conventional art. Therefore, when the spacer material is subsequently cured, the height of the spacer will be larger relative to its width than in the conventional prior art.

Figure 7:
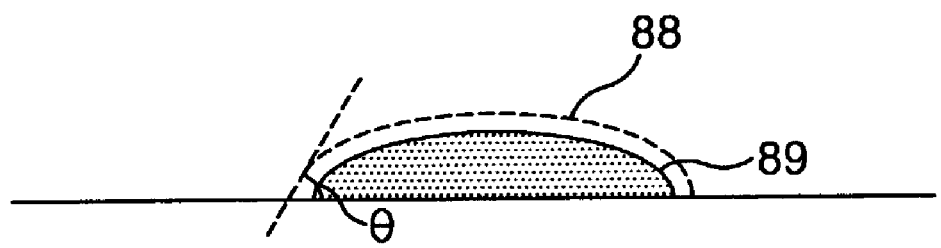
FIG. 7 depicts the shapes of a spacer material before curing and a spacer after curing of the spacer material deposited by the ink-jet system shown in FIG. 6.

Since the spacer material in effect is pre-cured in advance using the heater 90 and the air in the space between the nozzle 86 and the substrate, the bulk difference between the spacer material before curing process and the spacer material after the curing process is reduced. For example, the bulk B of the spacer material 88 jetted from the ink-jet device 80 before the curing process in FIG. 7 is not significantly different from the bulk B' of the spacer 89 after the curing process. Further, the contact angle θ of the spacer material 88 before the curing process is substantially equal to the contact angle θ of the spacer 89 after the curing process. Thus, a desired spacer height with a reduced spacer width can be achieved. Because, the spacer material is heated with the heater 90, a spacer material of either a high viscosity material or a high solid content material can be used in forming a spacer.

A method of manufacturing the spacer will be described with reference to FIG. 8A and FIG. 8B. The ink-jet system includes a heating coil to heat the nozzle 86 of the inkjet device 80 when a driving voltage is applied to the heating coil. While the heater 90 is heating the head 84, another driving voltage is applied to the piezoelectric device within the head 84 of the ink-jet device 80 to generate a physical pressure with a capillary phenomenon in which a flow path between the vessel 82 and the nozzle 86 repeatedly contracts and relaxes. Due to this capillary phenomenon, a spacer material 88 within the vessel 82 is jetted, via the nozzle 86, onto the substrate. The spacer material 88 has high viscosity of about 5 to about 15 cp before heating. During the jetting of the spacer material, the spacer material 88 receives heat from the heater 90 just before the spacer material 88 is jetted out of the nozzle.

Subsequently, the high viscosity spacer material 88 is reduced in viscosity as the spacer material travels toward the substrate due to the added heat from heater 90, substantially increasing the burn-off or evaporation rate of solvents or solutions within the spacer material.

Figure 8A:
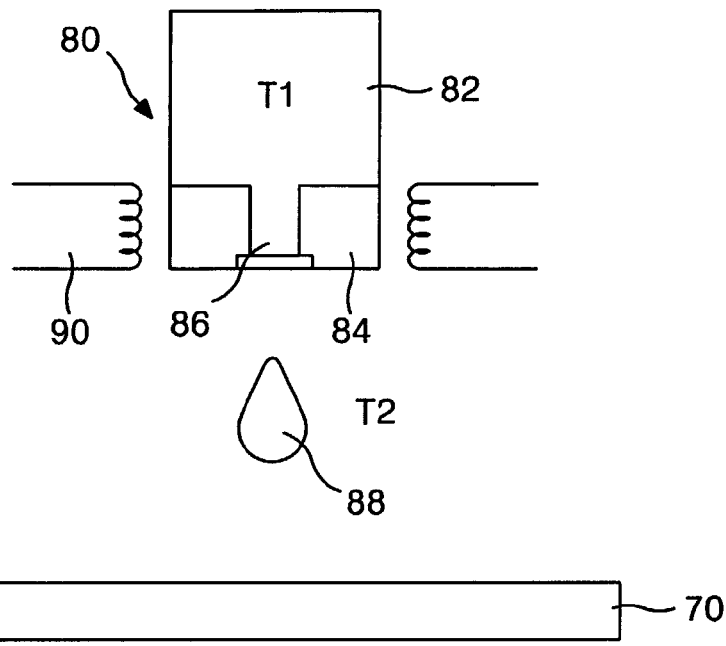
FIG. 8A and FIG. 8B show a method of manufacturing the spacer shown in FIG. 7.
Figure 8B:
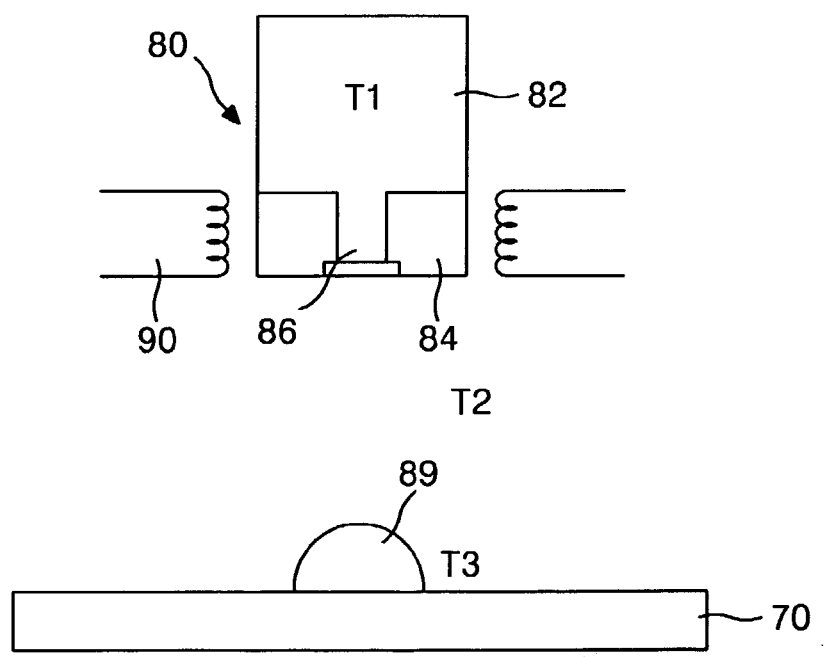

For example, a spacer material 88 is shown in FIG. 8A having such a lowering of viscosity while being jetted onto the surface of the substrate 70. As shown in FIG. 8A, since a temperature difference between the interior temperature T1 of the head 84 and the temperature T2 exterior to the ink-jet device 80 is large. Since T2 is less than T1, the spacer material 88 increases in viscosity while traveling exterior to the ink-jet device 80 toward the substrate. Further, the temperature T3 of the substrate 70 is cooler than the interior temperature T1 of the head 84 such that the spacer material 88 is further cooled by the substrate 70 when the spacer 89 is upon the substrate 70. Since the spacer material 88 is heated using the heater 90, then cooled immediately upon being jetted from the nozzle 86, and then cooled upon impact with the substrate, the shape of the spacer material can be controlled. Subsequently, the spacer material is cured with ultraviolet light to form a spacer 89, as shown in FIG. 8B. Accordingly, a spacer results having a narrower width and a larger height than a spacer in the conventional art, so that a suitable cell gap height can be achieved while maintaining an appropriate spacer width. Thus, brightness and contrast can be increased in the LCD panel to improve a picture quality.

As discussed above, a substrate 70 can be either one of an upper plate or a lower plate of an LCD device. An upper plate includes, for example, a black matrix, a color filter, a common electrode and an alignment film sequentially formed on an upper substrate. A lower plate includes, for example, a TFT, a pixel electrode and an alignment film sequentially formed on a lower substrate. On the lower plate, the spacer 89 is formed on an area of the lower substrate corresponding to the gate lines, thin film transistor or the data lines, or in area of the lower substrate that will correspond with the black matrix of the upper plate. In other words, the spacer 89 does not have to be formed on the pixel electrode of the lower plate. On the upper plate, the spacer 89 is formed on an area of the upper substrate corresponding to the black matrix.

As described above, according to the present invention, a head portion of the inkjet device is heated by means of a heating coil to heat a spacer material and then the spacer material is jetted. Thereafter, the jetted spacer material is cooled by the external temperature and by the cooled substrate. Since the high viscosity of the spacer material is decreased after jetting from the nozzle, a bulk difference before and after curing of the spacer almost is made small. Accordingly, it is possible to set the desired height of the spacer before curing.

Furthermore, according to the present invention, a material having either a high viscosity or a high solid content can be used as the spacer material. Accordingly, various spacer materials can be used to create a desired contact angle between the spacer and the surface of the substrate, so that it is possible to reduce spacer material cost. Also, it is possible to manufacture a spacer having a good adhesion. Moreover, according to the present invention, the jetting process for the spacer can be carried out simultaneously with at least some portion of the curing process, so that the processing time required for the curing and jetting processes is shortened in comparison to the conventional photolithography technique.

It will be apparent to those skilled in the art that various modifications and variations can be made in the apparatus and method for fabricating a liquid crystal display of the present invention without departing from the spirit or scope of the invention. Thus, it is intended that the present invention cover the modifications and variations of this invention provided they come within the scope of the appended claims and their equivalents.

What is claimed is:

1. A method for fabricating a liquid crystal display panel, comprising the steps of:

aligning an ink-jet device filled with a spacer material relative to a substrate of a liquid crystal display device;

heating the spacer material in the ink-jet device; jetting the spacer material from the ink-jet device across a space onto the substrate to form a bead having rounded edges that form a first contact angle with a horizontal surface of the substrate on which the bead is formed, the bead of the spacer material being in a partially cured state on the substrate; and fully curing the bead of the spacer material to form a beaded spacer, wherein rounded edges of the beaded spacer form a second contact angle with the horizontal surface of the substrate on which the beaded spacer is formed, the second contact angle being substantially the same as the first contact angle;

wherein said step of heating is performed by positioning a heater around a nozzle of the ink-jet device and heating the spacer material in the nozzle to a first temperature, which is greater than a second temperature of the space; and wherein the substrate has a third temperature that is less than the second temperature during said jetting of the spacer material.

2. The method as claimed in claim 1, further comprising the steps of:

cooling the spacer material in the space; and cooling the spacer material with the substrate.

3. The method as claimed in claim 2, wherein the step of curing includes radiating an ultraviolet ray onto the spacer material.

4. The method as claimed in claim 1, wherein the spacer material includes solid content material.

5. The method as claimed in claim 1, wherein the spacer material is provided on an area corresponding to a black matrix.

6. The method as claimed in claim 1, wherein the spacer is provided on an area other than on a pixel electrode.

* * * * *